United States Patent
Blackmon et al.

(10) Patent No.: US 7,470,764 B2
(45) Date of Patent: Dec. 30, 2008

(54) POLYMERIZATION CATALYST SYSTEM USING N-BUTYLMETHYLDIMETHOXYSILANE FOR PREPARATION OF POLYPROPYLENE FILM GRADE RESINS

(75) Inventors: Kenneth Paul Blackmon, Houston, TX (US); David J. Rauscher, Angleton, TX (US); Michael Ray Wallace, Dickinson, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 11/700,273

(22) Filed: Jan. 31, 2007

(65) Prior Publication Data

US 2007/0129238 A1 Jun. 7, 2007

Related U.S. Application Data

(62) Division of application No. 11/243,390, filed on Oct. 4, 2005, now Pat. No. 7,202,191, which is a division of application No. 10/659,414, filed on Sep. 10, 2003, now Pat. No. 7,109,143, which is a division of application No. 10/233,637, filed on Sep. 3, 2002, now Pat. No. 6,657,024.

(51) Int. Cl.
  *C08F 110/06* (2006.01)
(52) U.S. Cl. .................. 526/351; 526/124.2; 526/124.3; 526/125.3
(58) Field of Classification Search ................. 526/351, 526/124.3, 124.2, 125.3
  See application file for complete search history.

(56) References Cited

U.S. PATENT DOCUMENTS

| | | | | |
|---|---|---|---|---|
| 5,891,817 | A | * | 4/1999 | Shamshoum et al. ......... 502/127 |
| 6,090,325 | A | * | 7/2000 | Wheat et al. ............. 264/290.2 |
| 7,189,788 | B2 | * | 3/2007 | Machida et al. ............. 525/240 |

* cited by examiner

*Primary Examiner*—Ling-Siu Choi
(74) *Attorney, Agent, or Firm*—Diane L. Kilpatrick-Lee

(57) ABSTRACT

It has been discovered that using n-butylmethyldimethoxysilane (BMDS) as an external electron donor for Ziegler-Natta catalysts can provide a catalyst system that may prepare polypropylene films with improved properties. The catalyst systems of the invention provide for controlled chain defects/defect distribution and thus a regulated microtacticity. Consequently, the curve of storage modulus (G') v. temperature is shifted such that the film achieves the same storage modulus at a lower temperature enabling faster throughput of polypropylene film through a high-speed tenter.

6 Claims, 2 Drawing Sheets

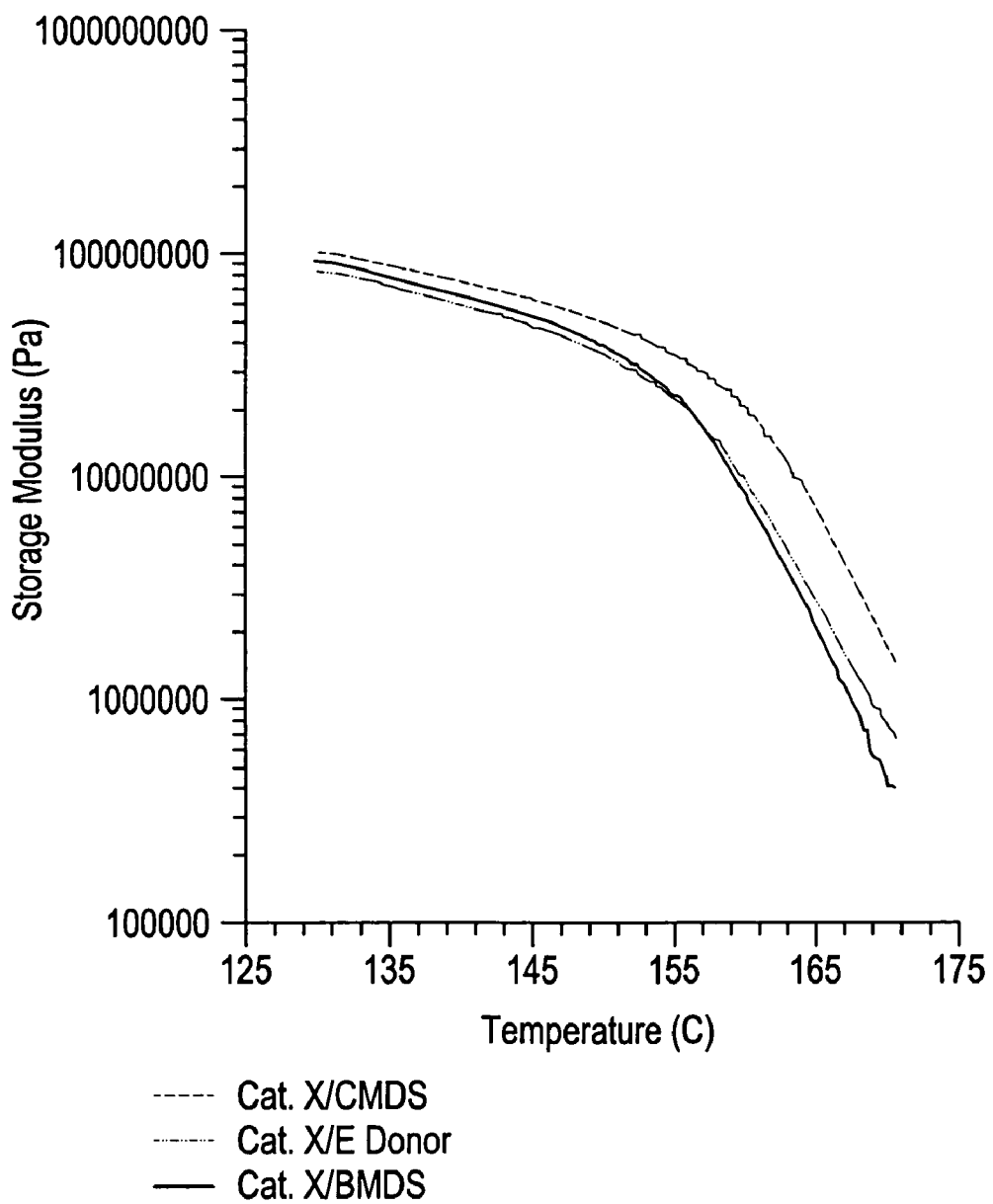

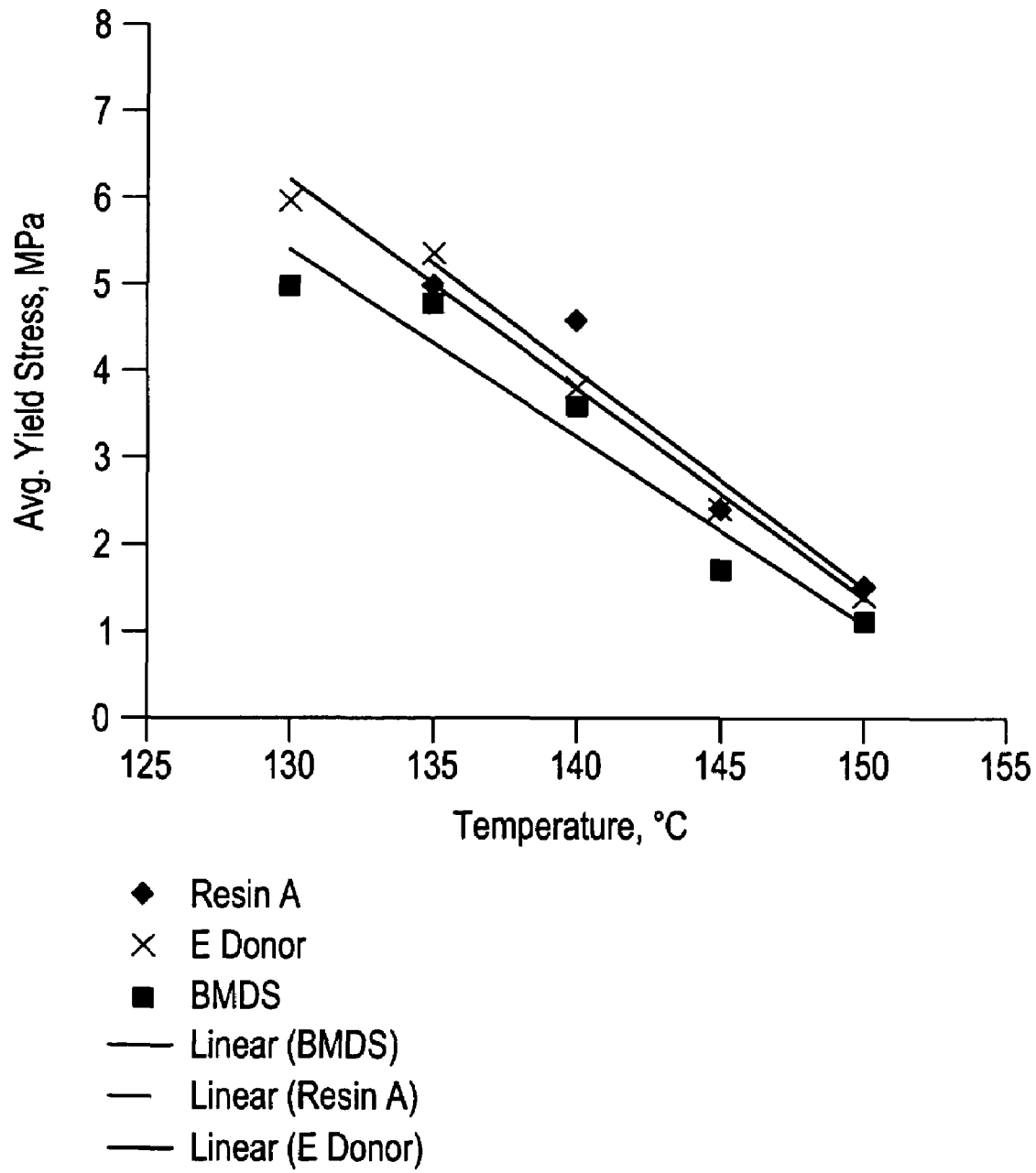

POLYMERIZATION CATALYST SYSTEM USING N-BUTYLMETHYLDIMETHOXYSILANE FOR PREPARATION OF POLYPROPYLENE FILM GRADE RESINS

CROSS REFERENCED TO RELATED APPLICATION

This application is a divisional of application Ser. No. 11/243,390 filed Oct. 4, 2005, now U.S. Pat. No. 7,202.191, which is a divisional of application Ser. No. 10/659,414 filed on Sep. 10, 2003, now U.S. Pat. No. 7,109,143, which is a divisional of application Ser. No. 10/233,637 filed Sep. 3, 2002, now U.S. Pat. No. 6,657,024, by Kenneth Paul Blackmon, David J. Rauscher and Michael Ray Wallace, under the same title.

FIELD OF THE INVENTION

The present invention relates to polymerization catalyst systems and processes for the preparation of polypropylene, and more particularly relates, in one embodiment, to polymerization catalyst systems for and controlled polymerization processes for the preparation of polypropylene of specified microtacticity that give improvement in physical properties and processability of polypropylene film.

BACKGROUND OF THE INVENTION

Thermoplastic olefin polymers, such as linear polyethylene, polypropylene, and olefin copolymers, are formed in polymerization reactions where a monomer is introduced into a reactor with an appropriate catalyst to produce the olefin homopolymer or copolymer. The polymer is withdrawn from the catalyst reactor and may be subjected to appropriate processing steps and then extruded as a thermoplastic mass through an extruder and die mechanism to produce the polymer as a raw material in particulate form, usually as pellets or granules. The polymer particles are ultimately heated and processed in the formation of the desired end products.

Polypropylene manufacturing processes typically involve the polymerization of propylene monomer with an organometallic catalyst of the Ziegler-Natta type. The Ziegler-Natta type catalyst polymerizes the propylene monomer to produce predominantly solid crystalline polypropylene. Polypropylene is most often produced as a stereospecific polymer. Many desirable product properties, such as strength and durability, depend on the crystallinity of the polypropylene that in turn is dependent on the stereospecific arrangement of methyl groups on the polymer backbone.

Stereospecific polymers are polymers that have a defined arrangement of molecules in space. Both isotactic and syndiotactic propylene polymers, for example, are stereospecific. The isotactic structure is typically described as having the methyl groups attached to the tertiary carbon atoms of successive monomeric units on the same side of a hypothetical plane through the main chain of the polymer, e.g., the methyl groups are all above or all below the plane. Isotactic polypropylene can be illustrated by the following chemical formula:

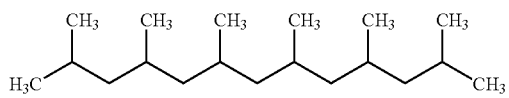

This structure provides a highly crystalline polymer molecule. Using the Fisher projection formula, the stereochemical sequence of isotactic polypropylene may be shown as follows:

Another way of describing the structure is through the use of NMR spectroscopy. Bovey's NMR nomenclature for an isotactic pentad is mmmm with each "m" representing a "meso" dyad or successive methyl groups on the same side in the plane. As known in the art, any deviation or inversion in the structure of the chain lowers the degree of isotacticity and crystallinity of the polymer.

This crystallinity distinguishes isotactic polymers from an amorphous or atactic polymer, which is soluble in an aromatic solvent such as xylene. Atactic polymer exhibits no regular order of repeating unit configurations in the polymer chain and forms essentially a waxy product. That is, the methyl groups in atactic polypropylene are randomly positioned. While it is possible for a catalyst to produce both amorphous and crystalline fractions, it is generally desirable for a catalyst to produce predominantly crystalline polymer with very little atactic polymer.

Catalyst systems for the polymerization of olefins are well known in the art. Typically, these systems include a Ziegler-Natta type polymerization catalyst; a co-catalyst, usually an organoaluminum compound; and an external electron donor compound or selectivity control agent, usually an organosilicon compound. Examples of such catalyst systems are shown in the following U.S. Pat. Nos. 4,107,413; 4,294,721; 4,439,540; 4,115,319; 4,220,554; 4,460,701; and 4,562,173; the disclosures of these patents are hereby incorporated by reference. These are just a few of the scores of issued patents relating to catalysts and catalyst systems designed primarily for the polymerization of propylene and ethylene.

Ziegler-Natta catalysts for the polymerization of isotactic polyolefins are well known in the art. The Ziegler-Natta catalysts are stereospecific complexes derived from a halide of a transition metal, such as titanium, chromium or vanadium with a metal hydride and/or metal alkyl, typically an organoaluminum compound as a co-catalyst. The catalyst is usually comprised of a titanium halide supported on a magnesium compound. Ziegler-Natta catalysts, such as titanium tetrachloride ($TiCl_4$) supported on an active magnesium dihalide, such as magnesium dichloride or magnesium dibromide, as disclosed, for example, in U.S. Pat. Nos. 4,298,718 and 4,544,717, both to Mayr, et al. are supported catalysts. Silica may also be used as a support. The supported catalyst may be employed in conjunction with a co-catalyst such as an alkylaluminum compound, for example, triethyl aluminum (TEAL), trimethyl aluminum (TMA) and triisobutyl aluminum (TIBAL).

The development of these polymerization catalysts has advanced in generations of catalysts. The catalysts disclosed in the patents referenced above are considered by most to be third or fourth generation catalysts. With each new generation of catalysts, the catalyst properties have improved, particularly the efficiencies of the catalysts, as expressed in kilograms of polymer product per gram of catalyst over a particular time.

In the utilization of a Ziegler-Natta catalyst for the polymerization of propylene, it is generally desirable to add an external donor. External donors act as stereoselective control agents to control the amount of atactic or non-stereoregular polymer produced during the reaction, thus reducing the amount of xylene solubles. Examples of external donors include the organosilicon compounds such as cyclohexylmethyldimethoxysilane (CMDS), dicyclopentyldimethoxysilane (CPDS) and diisopropyldimethoxysilane (DIDS). External donors, however, tend to reduce catalyst activity and tend to reduce the melt flow of the resulting polymer.

In addition to the improved catalysts, improved activation methods have also lead to increases in the catalyst efficiency. For example, one discovery involved a process for pre-polymerizing the catalyst just prior to introducing the catalyst into the reaction zone.

It is generally possible to control catalyst productivity (i.e., lbs. of polypropylene/lb. catalyst or other weight ratios) and product isotacticity within limits by adjusting the molar feed ratio of co-catalyst to external electron donor (and their corresponding ratios to the active metal content, e.g., titanium, in the Ziegler-Natta catalyst). Increasing the amount of external electron donor decreases the xylene solubles but may reduce activity and hence catalyst productivity. The xylene solubles (XS) content of the polypropylene product is a measure of the degree of stereoselectivity. Further, the polymer stereoregularity may be obtained by directly measuring the microtacticity of the product via $^{13}$C Nuclear Magnetic Resonance spectroscopy.

Selectivity to isotactic polypropylene is typically determined under the XS test by measuring the amount of polypropylene materials that are xylene soluble. The xylene-solubles were measured by dissolving polymer in hot xylene, cooling the solution to 0° C. and precipitating out the crystalline material. The xylene solubles are the wt. % of the polymer that was soluble in the cold xylene.

In particular with respect to film grade polyolefin resins for biaxially oriented polypropylene (BOPP) applications, there is continuing interest in identifying catalyst systems that offer potential improvements in polymer physical properties and processability. Some previous studies have focused on efforts to enhance resin processability/extrusion characteristics via broadening of polymer molecular weight distribution through utilization of particular donor types (e.g., bis(perhydroisoquinolino)dimethoxysilane (BPIQ)). Other, more recent studies have focused on the use of fluoroalkylsilane compounds (e.g., 3,3,3-trifluoro-propylmethyldimethoxysilane ("E" donor)) that potentially allow for a controlled lower polymer stereoregularity and slightly lower polymer melting temperature, thereby potentially improving resin processability during film production. Indeed, these various catalyst system approaches to the modification of polymer properties for potential enhancement of film grade characteristics have shown varying degrees of promise.

It would be particularly advantageous to determine the optimum type of external donor and molar ratio of co-catalyst to external electron donor in order to obtain a desirable polymer stereoregularity and minimize the amount of xylene solubles in polypropylene.

SUMMARY OF THE INVENTION

Accordingly, it is an object of the present invention to provide a catalyst, a method of making a catalyst, and a method of using the catalyst for polymerization or copolymerization of propylene to produce a polypropylene product having a controlled amount of xylene solubles.

It is another object of the present invention to provide a catalyst, a method of making a catalyst, and a method of using the catalyst for polymerization or copolymerization of propylene to produce a polypropylene product having a controlled microtacticity.

Still another object of the invention is to provide a catalyst, a method of making a catalyst, and a method of using the catalyst for polymerization or copolymerization of propylene to produce a polypropylene product having these controlled properties using an electron donor that is relatively inexpensive.

In carrying out these and other objects of the invention, there is provided, in one form, a catalyst system for the polymerization or copolymerization of propylene monomer having a Ziegler-Natta catalyst, an organoaluminum compound co-catalyst, and at least one external electron donor comprising n-butylmethyldimethoxysilane (BMDS).

In another embodiment of the invention, there is provided a process for the polymerization or copolymerization of propylene monomer that involves (a) providing a Ziegler-Natta catalyst, (b) contacting the catalyst with an organoaluminum compound, (c) contacting the catalyst with at least one electron donor comprising n-butylmethyldimethoxysilane (BMDS) simultaneously with or subsequent to (b), (d) introducing the catalyst into a polymerization reaction zone containing the organoaluminum compound, the electron donor and propylene monomer; and (e) removing polypropylene homopolymer or copolymer from the polymerization reaction zone.

In yet another embodiment of the invention, there is provided polypropylene that encompasses a propylene polymer or copolymer having a melt flow of at least about 0.5 g/10 min. and xylene solubles of not more than about 6 weight %, and a meso pentad level of between about 91 and about 98%, as measured by $^{13}$C NMR on the insoluble fraction (i.e., that portion which is insoluble in xylene and, subsequently, heptane). In still another embodiment of the invention, the invention concerns articles made from the polypropylene of this invention.

BRIEF DESCRIPTION OF THE DRAWINGS

FIG. 1 is a graph of Storage Modulus (G') v. Temperature for laboratory "film grade" resins prepared with a conventional Ti on Mg Ziegler-Natta catalyst and various donors (polymer characterization via a Rheometrics Dynamic Analyzer RDA II using a rectangular torsion temperature sweep; at a frequency of 300 rad/s and 1% strain); and FIG. 2 is a graph of Yield Stress v. Temperature for compression molded film grade resins on a Bruckner film stretcher using a stretch velocity of 3 m/min. and a stretch ratio of 4.

DETAILED DESCRIPTION OF THE INVENTION

It has been surprisingly discovered that the use of a Ziegler-Natta catalyst that includes n-butylmethyldimethoxysilane (BMDS) as an external electron donor for the polymerization of propylene can yield a polymer with a controlled microtacticity. More specifically, new polypropylene with tailored and controlled chain defects/defect distribution can result in improved stretchability of polypropylene films. These films may attain the same storage modulus (G', i.e. stiffness) at a lower temperature as otherwise comparable polypropylene films. As a result, the films may be heated faster to give very similar properties as compared with films from other polypropylene, and throughputs in high-speed film processing equipment can be increased. In a non-limiting instance, polypropylene film is desired to be produced at rates of about at least 300 and up to 500 m/min. (meters/minute).

The Ziegler-Natta catalysts useful in the present invention include those derived from a halide of a transition metal, such as titanium, chromium or vanadium, with titanium being the preferred metal in many embodiments. Examples of transition metal compounds include, but are not necessarily limited to, $TiCl_4$, $TiBr_4$, $TiO(C_2H_5)_3Cl$, $Ti(OC_2H_5)_3Cl$, $Ti(OC_3H_7)_2Cl_2$, $TiO(C_6H_{13})_2Cl_2$, $Ti(OC_2H_5)_2Br_2$ and $Ti(OC_{12}H_{25})Cl_3$. The transition metal compounds may be used individually or in combination. Typical titanium levels are from about 1.0% to about 5.0% by weight of catalyst, in one non-limiting embodiment of the invention. The Ziegler-Natta catalyst may be a transition metal compound of the formula $MR^+_x$ where M is selected from the group consisting of titanium, chromium, and vanadium, R is selected from the group consisting of halogen or a hydrocarboxyl, and x is the valence of M.

The transition metal halide is used in combination with a metal hydride and/or metal alkyl, typically an organoaluminum compound as a co-catalyst. Desirably the co-catalyst is an aluminum alkyl having the formula $AlR_3$, where R is an alkyl group having 1 to 8 carbon atoms, with R being the same or different. Examples of suitable aluminum alkyls include, but are not necessarily limited to, trimethyl aluminum (TMA), triethyl aluminum (TEAL) and triisobutyl aluminum (TIBAL). In one non-limiting embodiment of the invention, the desired aluminum alkyl is TEAL.

In one non-limiting theory about the mechanism by which the invention herein functions, the external donor operates by countering the loss of internal donor in the catalyst system. The nature of the internal donor is not particularly critical to the catalyst and its method of use in this invention, as long as the goals and objectives of the invention with respect to the polypropylene product are met. Suitable internal donors include, but are not necessarily limited to, diethers (such as those discussed in U.S. Pat. Nos. 4,971,937 and 5,106,807, which are incorporated herein by reference), aromatic diesters such as alkyl phthalate donors (e.g. diethyl phthalate, di-isobutyl phthalate, such as those listed in U.S. Pat. No. 5,945,366, which is also incorporated herein by reference), amines, amides, ketones, nitriles, phosphines, thioethers, thioesters, aldehydes, alcoholates, salts of organic acids, and combinations thereof. Preferred internal donors include, but are not necessarily limited to, esters of phthalic acid such as di-isobutyl, dioctyl, diphenyl, and benzylbutyl, and the like, and combinations thereof.

These internal electron donors are added during the preparation of the catalysts and may be combined with the support or otherwise complexed with the transition metal halide.

The Ziegler-Natta catalyst is typically a supported catalyst. Suitable support materials include magnesium compounds, such as magnesium halides, dialkoxymagnesiums, alkoxymagnesium halides, magnesium oxyhalides, dialkylmagnesiums, magnesium oxide, magnesium hydroxide, and carboxylates of magnesium. Typical magnesium levels are from about 12% to about 20% by weight of catalyst.

In the subject invention, the Ziegler-Natta catalyst must be used with at least one external donor compound, such as a Lewis base. More specifically, external donors are typically organosilicon compounds. External electron donors may be those described by the formula $SiR_m(OR')_{4-m}$, where R is an alkyl group, a cycloalkyl group, an aryl group or a vinyl group, R' is an alkyl group, m is 0-4, each R' may be the same or different, and each R may be the same or different. In particular, the external electron donor acts as a stereoregulator to control the amount of atactic form of polymer produced, which results is in a decrease in xylene solubles. Examples of electron donors that are organic silicon compounds are disclosed in U.S. Pat. Nos. 4,218,339; 4,395,360; 4,328,122; 4,473,660 and 4,927,797, which are incorporated herein by reference. Representative examples of external donors include cyclohexylmethyldimethoxysilane (CMDS), dicyclopentyldimethoxysilane (CPDS), diisopropyldimethoxysilane (DIDS), cyclohexylisopro-pyldimethoxysilane (CIDS), di-t-butyldimethoxysilane (DTDS), (3,3,3-trifluoropropyl)methyldimethoxysilane ("E"donor), and combinations thereof. However, in the subject invention, at least one of the electron donors that should be used is n-butylmethyldimethoxysilane (BMDS). As discussed, BMDS has been discovered to be used with Ziegler-Natta catalysts to produce polypropylene with a lower degree of microtacticity that is advantageous for BOPP film processability, but while retaining desirable melt flow and xylene solubles levels. It is within the scope of this invention to use BMDS in conjunction with one or more other external donors including, but not necessarily limited to, CMDS, CPDS, DIDS, CIDS, DTDS and/or "E" donor. In some cases it will be found that there is a synergistic effect between the internal donor and the external donor. That is, results will be obtained with a particular combination of internal donor and external donor that cannot be achieved with one or the other individually.

Unless specified otherwise, amounts of external donor are presented herein as parts per million (ppm) based on the weight of monomer. In one non-limiting embodiment of the invention, the amount of BMDS ranges from about 0.5 to about 500 ppm, preferably from about 2 to about 200 ppm, and most preferably from about 4 to about 20 ppm. Desirably, any second or subsequent external donor is used in the range of from about zero to about 5 ppm, with from about zero to about 3 ppm being preferred, from about zero to about 2 ppm being more preferred, from about zero to about 1.5 ppm being even more preferred, from about zero to about 1 ppm being still more preferred, and from about zero to about 0.5 ppm being still more preferred. The Al/Si molar ratio (organoaluminum compound to silane donor) may range from about 0.5 to about 500, preferably from about 1 to about 200, and most preferably from about 1 to about 100.

As is well known, polypropylene may be produced by slurry polymerization in the presence of a solvent, e.g. hexane, such as in a loop or CSTR reactor, or by bulk polymerization in which propylene serves as both monomer and diluent, which is typically carried out in a loop-type reactor. Also, polypropylene may be produced by gas phase polymerization of propylene, which is typically carried out in a fluidized bed reactor under lower pressures than bulk polymerization. In a typical bulk process, one or more loop reactors operating generally from about 50 to about 100° C. (preferably from about 60 to about 80° C.), with pressures of from about 300 to 700 psi (2.1 to 4.8 MPa) (preferably from about 450 to about 650 psi) (3.1 to 4.5 MPa may be used to polymerize propylene. The various catalytic components, i.e., Ziegler-Natta catalyst, cocatalyst, external donor, are introduced into the reactor, as well as a molecular weight controlling agent (if any, e.g., hydrogen), and the resulting polypropylene fluff or powder is continuously removed from the reactor. The fluff may then be subjected to extrusion to produce desired pellets.

In the study of this invention, a conventional titanium supported on an active magnesium dihalide Ziegler-Natta catalyst was used in the presence of three external silane donors to assess effects on polymerization performance and polymer properties. As will be discussed, it was discovered that BMDS yields a desirable decrease in polymer microtacticity, on the same order as "E" donor. Advantageously, BMDS is considerably less expensive than "E" donor.

For bulk polymerization utilizing the BMDS external donor-containing catalyst, the reactor temperatures are usually kept from about 50 to about 100° C., more particularly from about 60° C. to about 80° C. It should be noted that increasing the temperature (within limits) will typically result in an increased catalytic activity and lower xylene solubles. Hydrogen concentrations may vary, but are usually kept at from about 0.02 mol % to about 1.1 mol %, more particularly from about 0.04 mol % to about 0.5 mol % based on monomer, and depending on the resin melt flow desired.

The polymers produced in accordance with the present invention are those having a melt flow after polymerization of at least 0.5 g/10 min or greater, as measured according to ASTM D1238-95. Typical melt flows useful for preparation of BOPP film are from about 0.5 g/10 min to about 20 g/10 min, with from about 1.0 g/10 min to about 10 g/10 min being readily obtainable. Melt flows above 30 g/10 min, 50 g/10 min and even above 100 g/10 min are attainable, while still retaining low xylene solubles. Thus, the polymers of this invention are expected to be suitable for film grade resins as well as for injection molding applications, and the like. The polymers produced are also characterized as having low xylene solubles of not more than about 6 weight %, with from about 1 to about 5% being readily obtainable, and from 2 to about 4% being more readily obtainable, without any detrimental effects on melt flow. Additionally, the polypropylene homopolymer or copolymer may have a meso pentad level of between about 91 to about 98%, preferably from about 91-95% and most preferably from about 92 to about 95% as measured via $^{13}$C NMR on the insoluble (i.e., crystalline) fraction. The polydispersity (Mw/Mn) of the polypropylene homopolymer or copolymer, as measured via Size Exclusion Chromatography, may range from about 4 to about 10, preferably from about 6 to about 9.

As used herein, the terms "propylene polymer" or "polypropylene," unless specified otherwise, shall mean propylene homopolymers or those polymers composed primarily of propylene and limited amounts of other comonomers, such as ethylene, wherein the comonomers make up less than 0.5% by weight of polymer, and more typically less than 0.1% by weight of polymer. However, in some cases, minirandom copolymers with even small amounts of ethylene are not desired. The catalysts of this invention provide another way of adjusting the microtacticity of the polypropylene and thus improving the properties of film grade polypropylene.

The following examples serve to illustrate the present invention, but are not intended to limit the invention in any way.

A conventional titanium supported on an active magnesium dihalide Ziegler-Natta catalyst was used in the presence of three silane external donors to assess effects on polymerization performance and polymer properties. This conventional Ziegler-Natta catalyst typically contains approximately 2.8% titanium by weight and approximately 19.2% magnesium by weight, with an average particle size in the range of 10 to 14 microns, and is designated herein as Catalyst X. These donors included cyclohexylmethyldimethoxysilane (CMDS, "C" donor), 3,3,3-trifluoropropylmethyldimethoxysilane ("E" donor), and n-butylmethyldimethoxysilane (BMDS). Of particular interest was the effect on catalyst activity, polymer microtacticity, and polymer dynamic mechanical behavior. The general experimental conditions and reagents for the catalyst evaluations are shown in Table I, and the specific conditions for preparation of laboratory "film grade" resins are shown in Table II. The comparative resins produced have the characteristics shown in Table II.

TABLE I

Experimental Conditions for Catalyst Evaluations

| Reagents: | | Conditions: | |
|---|---|---|---|
| Catalyst: | 10 mg | Temp.: | 70° C. |
| TEAL: | 1.0 mmol | Time: | 1 hour |
| Ext. Donor: | 0.10 or 0.02 mmol | Propylene: | 1.4 L (0.72 kg) |
| | | Prepolymerization: | in situ |

TABLE II

Polymers Prepared Using Ti/Mg Z—N Catalyst in the Presence of Various Donors

| Ex # | Donor | Al/Si | H2, mol % | Activity, g/g/h | Melt Flow | Xylene Sols., % |
|---|---|---|---|---|---|---|
| 1 | CMDS | 40 | 0.09 | 36300 | 3.2 | 4.3 |
| 2 | BMDS | 20 | 0.05 | 25000 | 2.8 | 3.7 |
| 3 | E | 40 | 0.045 | 30500 | 2.1 | 3.8 |

In general, the activities of Catalyst X used in Table I may be relatively similar in the presence of the various donors. As seen above, the activities ranged from 25-36,000 g/g/h, depending on conditions needed to obtain "film grade" resins (i.e., MF of about 2-3, XS of about 3.5-4.5%). Also, BMDS gave very similar polymer properties as compared to "E" donor. For example, the polymers prepared with both BMDS and "E" donors possessed somewhat more narrow polydispersities (approximately 6-6.5) than those prepared in the presence of CMDS. The polymer melting points and heats of fusion and recrystallization were also very similar, and somewhat lower than those from CMDS, indicating a desirable reduction in polymer crystallinity. From $^{13}$C NMR analyses of the insoluble fractions, the polymers prepared with this Ziegler-Natta catalyst in the presence of BMDS and "E" donors showed reductions in chain stereoregularity. The polymer from BMDS possessed a meso pentad level of 93%, and the polymer from "E" donor showed 92.4%. The polypropylene from CMDS gave an mmmm level of about 94%. Thus, clearly BMDS yields a desirable decrease in polymer microtacticity, on the same order as does "E" donor. Further details are given in Table III.

TABLE III

Microtacticities from $^{13}$C NMR for Polymers Prepared with Catalyst X Using Various Donors

| | Example | | |
|---|---|---|---|
| | 1 | 2 | 3 |
| Donor | CMDS | BMDS | E |
| MF, g/10 min | 3.2 | 2.8 | 2.1 |
| XS, % | 4.3 | 3.7 | 3.8 |
| mmmm | 93.9 | 93.0 | 92.4 |
| mmmr | 2.6 | 3.1 | 3.1 |
| rmmr | 0.5 | 0.3 | 0.4 |
| mmrr | 1.5 | 2.2 | 2.3 |
| xmrx | 0.9 | 0.4 | 0.7 |
| mrmr | 0.0 | 0.0 | 0.0 |
| rrrr | 0.0 | 0.0 | 0.0 |
| rrrm | 0.0 | 0.0 | 0.0 |
| mrrm | 0.6 | 1.0 | 1.1 |
| % meso | 98.2 | 97.7 | 97.4 |
| % racemic | 1.8 | 2.3 | 2.6 |
| % error | 1.0 | 0.5 | 0.8 |
| Defects/1000 C. | 9.0 | 11.4 | 13.2 |

Dynamic mechanical analyses were conducted with a Rheometrics Dynamic Analyzer RDA II to measure the polymer stiffness as a function of temperature. The results are presented in FIG. 1. The FIG. 1 DMA results show that resins prepared with BMDS and "E" donors behave similarly in terms of stiffness vs. temperature. The desirably reduced stiffness (relative to polymer prepared with CMDS) is due to the reduced polymer stereoregularity. These results are confirmed by the measured T* values, which show 159.7° C. for polypropylene prepared with BMDS and 161.2° C. for "E" donor. The standard donor, CMDS, gives a T* value of 164° C. The T* value is the temperature at which the complex modulus of the material reaches a discrete value, e.g. $1.4 \times 10^8$ dyn/cm$^2$. Some in the industry have found that a lower T* value, within a specified range, will suggest a wider temperature window in the tenter apparatus, thereby making it easier to run the film lines at the desired throughput. The T* value is somewhat analogous to the melting point of the polymer, and is a parameter used by some corporations because it can be determined in the laboratory. Again, it is seen that polymer prepared in the presence of BMDS compares very favorably against "E" donor. In general, it is desired to lower the T* value, as long as it is not too low, i.e. it should not be so low as to adversely affect other parameters. As is typical in polypropylene film processing, a balance between desirable values in a number of parameters must be achieved. Relatively low MF and controlled XS values are desired for polypropylene film.

The catalyst system of this invention yields resins having controlled lower polymer stereoregularity, and concomitantly lower T* values, which provide improved film processability.

Film Properties

Due to the desirable microtacticity reduction for polymers prepared in the presence of BMDS and E donor, it was of interest to further characterize the resins in terms of film behavior. A compression molding procedure for the preparation of films that could be studied in a Bruckner film stretcher was developed. Briefly, a Carver Compression Molding Press was utilized to prepare films, with the methodology being developed using a standard film grade resin, Resin A (MF of 2.8, XS of 3.8-4%). Several parameters (e.g., temperature, pressure, hold times) were varied during the course of the study. Ultimately, a molding temperature of 220° C., a low pressure (2000 psi) hold time of 5 min, and a high pressure (36 T (490 MPa) hold time of 5 min were the settled upon conditions. A 15 mil (0.015 in) (0.38 mm) picture-frame mold with 6 in.×6 in. (15×15 cm) internal diameter was used to make the films. Before molding, the polypropylene fluffs were stabilized with a phenolic/phosphite antioxidant system, e.g., about 1500 ppm Irganox-1010/Irgafos-168 (2:1) to prevent significant degradation. For each of the three samples tested (i.e., Resin A, BMDS, E donor), a total of about 12 films were compression molded to allow for Bruckner studies at different temperatures. The thicknesses of the pressed films were generally in the 16-17 mil (0.41-0.43 mm) range, with quite acceptable gauge uniformity.

As noted, the ultimate goal of the work was to evaluate the processability of the polymers via the Bruckner film stretcher. The compression-molded films were all aged for at least one week prior to running (to remove any residual stresses in the films that, in any event, should be minor due to the fact that compression molding was used). A few initial Resin A films were stretched at 140° C. under various stretch velocity (3-10 m/min) and stretch ratio (4-7×) conditions to assess behavior. Ultimately, a stretch velocity of 3 m/min and a biaxial stretch ratio of 4 were chosen. The compression-molded films stretched relatively well under these conditions, showing the least tendency for breaks to occur.

In terms of the Bruckner studies, temperatures were varied from 130 to 150° C. to determine biaxial film stretching behavior and yield stresses. Generally at each temperature several films were stretched, and an average yield stress was calculated. In most cases, the data reproducibility was quite reasonable. Table IV shows the average yield stresses of the various polymers as a function of temperature, and the results are presented graphically in FIG. 2.

TABLE IV

Bruckner Results for Compression Molded Film Grade Resins

| Ex. | Resin | Stretching Temperature, ° C. | Avg. Yield Stress, MPa | Comments |
|---|---|---|---|---|
| 4 | Resin A | 135 | 5.0 | Occasional small hole and/or small break |
| 5 | " | 140 | 4.6 | No Breaks |
| 6 | " | 145 | 2.4 | " |
| 7 | " | 150 | 1.5 | " |
| 8 | BMDS | 130 | 5.0 | No Breaks |
| 9 | " | 135 | 4.8 | " |
| 10 | " | 140 | 3.6 | " |
| 11 | " | 145 | 1.7 | " |
| 12 | " | 150 | 1.1 | " |
| 13 | E Donor | 130 | 6.0 | Some breaks |
| 14 | " | 135 | 5.4 | No Breaks |
| 15 | " | 140 | 3.8 | " |
| 16 | " | 145 | 2.4 | " |
| 17 | " | 150 | 1.4 | " |

As seen from the above results, the polymer film yield stresses expectedly decreased in a linear fashion with increasing stretching temperature. As is typical, some scatter in the data were evident; however, reasonable correlation coefficients of 0.94-0.98 were obtained. The yield stress results as a function of temperature for films prepared with the fluoroalkylsilane donor (E donor) were relatively similar to those of the current film grade resin, Resin A. Both resins showed good film stretching behavior and similar dependence of yield stress on temperature. It was generally expected that the reduced microtacticity (mmmm −92.4%) of the polymer made with E donor would be reflected in perhaps lower (or flatter) yield stresses vs. temperature. The resin prepared with Catalyst X in the presence of BMDS showed desirably lower yield stresses at a given temperature than did the other tested film resins. Such results were expected based on the reduced microtacticity of the polymer (mmmm −93%). Thus, the results of the Bruckner film stretching study showed some differences in film properties amongst the various resins, with BMDS giving a T350 temperature (i.e., temperature at which the yield stress is 350 psi [2.41 MPa]) of 144° C., and E donor and Resin A giving 146-146.5° C. From a practical point of view, the resin with the lower processability temperature (i.e., BMDS) may offer some advantage in the tenter portion (due to reduced heating needs, etc. which may translate into increased speeds).

Selected films that were biaxially oriented (stretch ratio −4×) on the Bruckner Film Stretcher were cut into about 10 in. strips (about 25.4 cm) for obtaining tensile properties. Films of each resin stretched at 140 and 145° C. were selected for these analyses. Table V gives the tensile properties as measured via an Instron tester.

TABLE V

Tensile Properties for Film Grade Resins
Stretched via the Bruckner [Ratio - 4X]

| | Ex. | | | | | |
|---|---|---|---|---|---|---|
| | 18<br>Resin A | 19<br>Resin A | 20<br>BMDS | 21<br>BMDS | 22<br>E Donor | 23<br>E Donor |
| Stretch Temp., °C. | 140 | 145 | 140 | 145 | 140 | 145 |
| Tens. Str., Yld. psi (MPa) | 4150 (28.6) | 3800 (26.2) | 3990 (27.5) | 3820 (26.3) | 4620 (31.8) | 4600 (31.7) |
| Tens. Str., Brk. psi (MPa) | 22200 (153) | 19600 (135) | 18800 (130) | 16500 (114) | 22900 (158) | 21600 (149) |
| Elong., Yld., % | 2.0 | 2.0 | 2.2 | 2.4 | 2.2 | 2.2 |
| Elong., Brk., % | 81 | 64 | 81 | 80 | 69 | 61 |

From the above results, it is seen that the oriented films (4×) exhibited tensile strengths at yield in the 3800-4600 psi range (26.2-31.7 MPa), with the films prepared with E donor showing the highest values and BMDS the lowest. Similar results were noted for the tensile strengths at break, with values typically in the 16-23,000 psi (110-159 MPa) range. All of the films (whether stretched at 140 or 145° C.) gave similar elongations at yield of ~2% and break at 50-80%.

In the foregoing specification, the invention has been described with reference to specific embodiments thereof, and has been demonstrated as effective in providing a method for making a Ziegler-Natta catalyst system for the polymerization and copolymerization of propylene monomer. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations or amounts of co-catalysts, internal donors, and external donors, and other components falling within the claimed parameters, but not specifically identified or tried in a particular catalyst system, are anticipated and expected to be within the scope of this invention. Further, the method of the invention is expected to work at other conditions, particularly temperature, pressure and concentration conditions, than those exemplified herein.

We claim:

1. A polypropylene comprising a propylene polymer or copolymer having a melt flow of at least about 0.5 g/10 min. and xylene solubles of from 3.5 wt. % to about 6 wt. %, and a meso pentad level of from about 91 to 94%.

2. The polypropylene of claim 1 further having a polydispersity ranging from about 4 to about 10.

3. The polypropylene of claim 1 where the polypropylene is formed by a process comprising:
   (a) providing a Ziegler-Natta catalyst;
   (b) contacting the catalyst with an organoaluminum compound;
   (c) contacting the catalyst with at least one electron donor comprising n-butylmethyldimethoxysilane (BMDS) simultaneously with or subsequent to (b);
   (d) introducing the catalyst into a polymerization reaction zone containing the organoaluminum compound, the electron donor and propylene monomer; and
   (e) removing polypropylene homopolymer or copolymer from the polymerization reaction zone.

4. The polypropylene of claim 1 where the polypropylene has a lower processability temperature as compared to a polypropylene formed in the absence of BMDS that is otherwise identical.

5. An article formed from polypropylene comprising a propylene polymer or copolymer having a melt flow of at least about 0.5 g/10 min. and xylene solubles of from 3.5 wt. %; to about 6 wt. % and a meso pentad level of from about 91% to 94%.

6. The article of claim 5 where the polypropylene is formed by a process comprising:
   (a) providing a Ziegler-Natta catalyst;
   (b) contacting the catalyst with an organoaluminum compound;
   (c) contacting the catalyst with at least one electron donor comprising n-butylmethyldimethoxysilane (BMDS) simultaneously with or subsequent to (b);
   (d) introducing the catalyst into a polymerization reaction zone containing the organoaluminum compound, the electron donor and propylene monomer; and (e) removing polypropylene homopolymer or copolymer from the polymerization reaction zone.

* * * * *